US010680392B2

(12) United States Patent
Byrne et al.

(10) Patent No.: US 10,680,392 B2
(45) Date of Patent: Jun. 9, 2020

(54) FURNITURE-MOUNTED ELECTRICAL CHARGING STATION

(71) Applicants: Norman R. Byrne, Ada, MI (US); Joseph D. Ward, Grand Rapids, MI (US)

(72) Inventors: Norman R. Byrne, Ada, MI (US); Joseph D. Ward, Grand Rapids, MI (US)

( * ) Notice: Subject to any disclaimer, the term of this patent is extended or adjusted under 35 U.S.C. 154(b) by 0 days.

(21) Appl. No.: 16/042,440

(22) Filed: Jul. 23, 2018

(65) Prior Publication Data

US 2019/0027874 A1    Jan. 24, 2019

Related U.S. Application Data

(60) Provisional application No. 62/536,433, filed on Jul. 24, 2017.

(51) Int. Cl.

| *H01R 13/73* | (2006.01) |
|---|---|
| *H01R 13/66* | (2006.01) |
| *H01R 27/02* | (2006.01) |
| *H01R 24/30* | (2011.01) |
| *H01R 25/00* | (2006.01) |
| *H01R 13/447* | (2006.01) |
| *H02J 7/00* | (2006.01) |
| *H02J 7/34* | (2006.01) |

(52) U.S. Cl.
CPC .......... *H01R 13/73* (2013.01); *H01R 13/447* (2013.01); *H01R 13/6691* (2013.01); *H01R 24/30* (2013.01); *H01R 25/006* (2013.01); *H01R 27/02* (2013.01); *H02J 7/0027* (2013.01); *H02J 7/00* (2013.01); *H02J 7/342* (2020.01)

(58) Field of Classification Search
CPC ... H02J 7/0054; H02J 9/062; A47B 2021/066; A47B 2021/068
USPC ......................................................... 320/103
See application file for complete search history.

(56) References Cited

U.S. PATENT DOCUMENTS

| 3,006,589 A | 10/1961 | Drysdale | |
|---|---|---|---|
| 3,049,688 A | * 8/1962 | Sinopoli | H01R 25/006 439/41 |
| 4,266,266 A | 5/1981 | Sanner | |
| 4,300,087 A | 11/1981 | Meisner | |
| 4,323,723 A | 4/1982 | Fork et al. | |
| 4,453,059 A | 6/1984 | Fukushima | |
| 4,641,077 A | * 2/1987 | Pascaloff | A61L 2/00 320/113 |

(Continued)

FOREIGN PATENT DOCUMENTS

| CN | 202552802 | 11/2012 | |
|---|---|---|---|
| GB | 2528022 A | * 1/2016 | ............. H02J 7/025 |

(Continued)

*Primary Examiner* — David V Henze-Gongola
(74) *Attorney, Agent, or Firm* — Gardner, Linn, Burkhart & Ondersma LLP (57) ABSTRACT

An electrical charging station includes a main housing and a separate receptacle housing, both configured for coupling to a furniture article. The charging station includes an electrical output connector that is accessible at the receptacle housing, a self-contained electrical power source such as a rechargeable battery inside the main housing, and a wiring harness electrically disposed (and directing power) between the self-contained electrical power source and the electrical output connector.

20 Claims, 7 Drawing Sheets

(56) References Cited

U.S. PATENT DOCUMENTS

| | | | |
|---|---|---|---|
| D291,300 S | 8/1987 | Chaney | |
| 4,747,788 A | 5/1988 | Byrne | |
| 4,828,513 A | 5/1989 | Morrison et al. | |
| 5,057,039 A | 10/1991 | Persing et al. | |
| 5,130,494 A * | 7/1992 | Simonton | A47B 21/06 108/23 |
| 5,171,159 A | 12/1992 | Byrne | |
| 5,195,288 A | 5/1993 | Penczak | |
| 5,230,552 A | 7/1993 | Schipper et al. | |
| 5,351,173 A | 9/1994 | Byrne | |
| D355,890 S | 2/1995 | Lentz | |
| 5,404,279 A | 3/1995 | Wood | |
| 5,472,157 A | 12/1995 | Lehrman | |
| 5,501,614 A | 3/1996 | Tsuchiya | |
| 5,575,668 A | 11/1996 | Timmerman | |
| 5,709,156 A | 1/1998 | Gevaert et al. | |
| 5,715,761 A | 2/1998 | Frattini | |
| 5,765,932 A | 6/1998 | Domina et al. | |
| 5,814,968 A | 9/1998 | Lovegreen et al. | |
| D408,352 S | 4/1999 | Tashiro | |
| D413,571 S | 9/1999 | Glass | |
| 5,954,525 A | 9/1999 | Siegal et al. | |
| 5,959,433 A | 9/1999 | Rohde | |
| 5,964,618 A | 10/1999 | McCarthy | |
| 6,004,157 A | 12/1999 | Glass | |
| 6,028,267 A | 2/2000 | Byrne | |
| 6,028,413 A | 2/2000 | Brockmann | |
| 6,036,516 A | 3/2000 | Byrne | |
| 6,081,356 A | 6/2000 | Branc et al. | |
| 6,254,427 B1 | 7/2001 | Stathis | |
| 6,290,518 B1 | 9/2001 | Byrne | |
| 6,379,182 B1 | 4/2002 | Byrne | |
| 6,436,299 B1 | 8/2002 | Baarman et al. | |
| 6,492,591 B1 | 12/2002 | Metcalf | |
| 6,540,554 B2 | 4/2003 | McCarthy | |
| 6,589,073 B2 | 7/2003 | Lee | |
| 6,595,144 B1 | 7/2003 | Doyle | |
| 6,619,980 B1 | 9/2003 | Hsiao | |
| D486,793 S | 2/2004 | Gershfeld | |
| 6,689,954 B2 | 2/2004 | Vaughan et al. | |
| 6,717,053 B2 | 4/2004 | Rupert | |
| 6,756,697 B2 | 6/2004 | Mizutani et al. | |
| 6,803,744 B1 | 10/2004 | Sabo | |
| 6,875,051 B2 | 4/2005 | Pizak | |
| 6,885,796 B2 | 4/2005 | Lubkert et al. | |
| 6,967,462 B1 | 11/2005 | Landis | |
| 6,971,911 B2 | 12/2005 | Ramsey et al. | |
| 7,083,421 B1 | 8/2006 | Mori | |
| 7,149,099 B2 | 12/2006 | Asbery | |
| D535,257 S | 1/2007 | Byrne | |
| 7,183,504 B2 | 2/2007 | Byrne | |
| 7,212,414 B2 | 5/2007 | Baarman | |
| 7,222,031 B2 | 5/2007 | Heatley | |
| 7,223,122 B2 | 5/2007 | Mori | |
| 7,233,222 B2 | 6/2007 | Baarman et al. | |
| 7,236,087 B2 | 6/2007 | Vasquez et al. | |
| 7,262,700 B2 | 8/2007 | Hsu | |
| 7,355,150 B2 | 4/2008 | Baarman et al. | |
| 7,392,068 B2 | 6/2008 | Dayan et al. | |
| 7,399,202 B2 | 7/2008 | Dayan et al. | |
| 7,407,392 B2 | 8/2008 | Cooke et al. | |
| 7,443,057 B2 | 10/2008 | Nunally | |
| 7,465,178 B2 | 12/2008 | Byrne | |
| 7,488,203 B2 | 2/2009 | Leddusire | |
| 7,633,263 B2 | 12/2009 | Toya | |
| 7,736,178 B2 | 6/2010 | Byrne | |
| 7,817,405 B2 | 10/2010 | Neumann et al. | |
| 7,863,861 B2 | 1/2011 | Cheng et al. | |
| 7,878,845 B2 | 2/2011 | Byrne | |
| 7,887,113 B2 | 2/2011 | Lambarth et al. | |
| D636,728 S | 4/2011 | Terleski et al. | |
| 7,938,679 B2 | 5/2011 | Wadsworth et al. | |
| 8,061,864 B2 | 11/2011 | Metcalf et al. | |
| 8,076,900 B1 | 12/2011 | Brown | |
| 8,106,539 B2 | 1/2012 | Schatz et al. | |
| 8,203,307 B2 | 6/2012 | Zick et al. | |
| 8,262,244 B2 | 9/2012 | Metcalf et al. | |
| 8,283,812 B2 | 10/2012 | Azancot et al. | |
| 8,295,036 B2 | 10/2012 | Byrne | |
| 8,395,353 B2 | 3/2013 | Wang et al. | |
| 8,398,408 B1 | 3/2013 | Hansen et al. | |
| 8,421,407 B2 | 4/2013 | Johnson | |
| 8,444,432 B2 | 5/2013 | Byrne et al. | |
| 8,456,038 B2 | 6/2013 | Azancot et al. | |
| 8,480,429 B2 | 7/2013 | Byrne | |
| 8,482,160 B2 | 7/2013 | Johnson et al. | |
| 8,487,478 B2 | 7/2013 | Kirby et al. | |
| 8,497,601 B2 | 7/2013 | Hall et al. | |
| 8,558,661 B2 | 10/2013 | Zeine | |
| 8,559,172 B2 | 10/2013 | Byrne | |
| 8,581,444 B2 | 11/2013 | Urano | |
| 8,596,588 B1 | 12/2013 | Sikkema et al. | |
| 8,618,695 B2 | 12/2013 | Azancot et al. | |
| 8,624,750 B2 | 1/2014 | Azancot | |
| D701,830 S | 4/2014 | Edwards | |
| 8,721,124 B2 * | 5/2014 | Byrne | F21V 21/22 362/285 |
| 8,901,419 B2 | 12/2014 | Galasso | |
| 8,937,407 B2 | 1/2015 | Byrne et al. | |
| 8,951,054 B2 | 2/2015 | Byrne et al. | |
| 9,000,298 B2 | 4/2015 | Byrne | |
| 9,084,475 B2 | 7/2015 | Hjelm | |
| 9,148,006 B2 | 9/2015 | Byrne et al. | |
| 9,362,764 B2 | 6/2016 | Farkas et al. | |
| 9,385,549 B2 | 7/2016 | Miller et al. | |
| 9,438,070 B2 | 9/2016 | Byrne et al. | |
| 9,484,751 B2 | 11/2016 | Byrne et al. | |
| 9,513,682 B2 | 12/2016 | Fleisig | |
| 9,543,692 B2 | 1/2017 | Shomali | |
| 9,608,455 B2 | 3/2017 | Byrne et al. | |
| 10,003,204 B2 * | 6/2018 | Clark | H02J 7/0045 |
| 10,181,735 B2 | 1/2019 | Byrne et al. | |
| 2002/0119698 A1 | 8/2002 | McCarthy | |
| 2002/0171335 A1 | 11/2002 | Held | |
| 2003/0048254 A1 | 3/2003 | Huang | |
| 2003/0185515 A1 | 10/2003 | Lubkert et al. | |
| 2003/0186582 A1 | 10/2003 | Laukhuf et al. | |
| 2003/0202317 A1 | 10/2003 | Jans | |
| 2004/0026998 A1 | 2/2004 | Henriott et al. | |
| 2004/0150934 A1 | 8/2004 | Baarman | |
| 2004/0189246 A1 | 9/2004 | Bulai et al. | |
| 2005/0209933 A1 | 9/2005 | Thompson | |
| 2005/0225292 A1 | 10/2005 | Damlamian et al. | |
| 2006/0159064 A1 | 7/2006 | Harnois | |
| 2006/0258195 A1 | 11/2006 | Schwartz et al. | |
| 2007/0182367 A1 | 8/2007 | Partovi | |
| 2007/0247037 A1 | 10/2007 | Schenker | |
| 2007/0279002 A1 | 12/2007 | Partovi | |
| 2008/0001572 A9 | 1/2008 | Baarman et al. | |
| 2008/0079392 A1 | 4/2008 | Baarman et al. | |
| 2008/0166965 A1 | 7/2008 | Greene et al. | |
| 2008/0169910 A1 | 7/2008 | Greene et al. | |
| 2008/0200050 A1 * | 8/2008 | Byrne | H01R 35/04 439/131 |
| 2008/0262932 A1 | 10/2008 | Wareham | |
| 2009/0012634 A1 | 1/2009 | Koch | |
| 2009/0032660 A1 | 2/2009 | Wadsworth et al. | |
| 2009/0045772 A1 | 2/2009 | Cook et al. | |
| 2009/0156061 A1 | 6/2009 | Bernstein | |
| 2009/0212636 A1 | 8/2009 | Cook et al. | |
| 2009/0212638 A1 | 8/2009 | Johnson | |
| 2009/0230777 A1 | 9/2009 | Baarman et al. | |
| 2009/0271048 A1 | 10/2009 | Wakamatsu | |
| 2009/0278494 A1 | 11/2009 | Randall | |
| 2010/0007307 A1 | 1/2010 | Baarman et al. | |
| 2010/0038970 A1 | 2/2010 | Cook et al. | |
| 2010/0052431 A1 | 3/2010 | Mita | |
| 2010/0127660 A1 | 5/2010 | Cook et al. | |
| 2010/0187913 A1 | 7/2010 | Smith et al. | |
| 2010/0201201 A1 | 8/2010 | Mobarhan et al. | |
| 2010/0244584 A1 | 9/2010 | Azancot et al. | |
| 2010/0259401 A1 | 10/2010 | Azancot et al. | |
| 2010/0290215 A1 | 11/2010 | Metcalf et al. | |
| 2010/0308665 A1 | 12/2010 | Itkonen | |

(56) References Cited

U.S. PATENT DOCUMENTS

| | | |
|---|---|---|
| 2010/0321939 A1 | 12/2010 | Patel |
| 2011/0006611 A1 | 1/2011 | Baarman et al. |
| 2011/0062789 A1 | 3/2011 | Johnson et al. |
| 2011/0109211 A1 | 5/2011 | Kirkeby et al. |
| 2011/0121660 A1 | 5/2011 | Azancot et al. |
| 2011/0175544 A1 | 7/2011 | Jong |
| 2011/0193417 A1 | 8/2011 | Hirasaka et al. |
| 2011/0241607 A1 | 10/2011 | Wiegers |
| 2011/0241614 A1 | 10/2011 | Yeh |
| 2011/0248575 A1 | 10/2011 | Kim et al. |
| 2011/0260548 A1 | 10/2011 | Urano |
| 2011/0305056 A1 | 12/2011 | Chien |
| 2012/0113576 A1 | 5/2012 | Cooper et al. |
| 2012/0113645 A1 | 5/2012 | Liao et al. |
| 2012/0117730 A1 | 5/2012 | Lemire et al. |
| 2012/0153731 A9 | 6/2012 | Kirby et al. |
| 2012/0206097 A1 | 8/2012 | Soar |
| 2012/0228953 A1 | 9/2012 | Kesler et al. |
| 2012/0235474 A1 | 9/2012 | Mannino et al. |
| 2012/0261998 A1 | 10/2012 | Sato |
| 2012/0299539 A1 | 11/2012 | Jones et al. |
| 2012/0312196 A1 | 12/2012 | Newkirk |
| 2013/0049482 A1 | 2/2013 | Rofe et al. |
| 2013/0057203 A1 | 3/2013 | Jones et al. |
| 2013/0141038 A1 | 6/2013 | Papa |
| 2013/0175986 A1 | 7/2013 | Senatori |
| 2013/0200717 A1 | 8/2013 | Bourilkov et al. |
| 2013/0207478 A1 | 8/2013 | Metcalf et al. |
| 2013/0234481 A1 | 9/2013 | Johnson |
| 2013/0285606 A1 | 10/2013 | Ben-Shalom et al. |
| 2014/0098525 A1 | 4/2014 | Bennett |
| 2014/0191568 A1 | 7/2014 | Partovi |
| 2014/0195336 A1 | 7/2014 | Dublin et al. |
| 2014/0203757 A1* | 7/2014 | Ibragimova ............ H02J 7/0042 320/103 |
| 2014/0333263 A1* | 11/2014 | Stewart ................ H02J 7/0042 320/111 |
| 2014/0335919 A1 | 11/2014 | Stewart et al. |
| 2014/0361633 A1 | 12/2014 | Abe |
| 2015/0007756 A1 | 1/2015 | Kollreider et al. |
| 2015/0008879 A1 | 1/2015 | Schneider et al. |
| 2015/0015182 A1 | 1/2015 | Brandtman et al. |
| 2015/0096473 A1 | 4/2015 | Leukel et al. |
| 2015/0295447 A1* | 10/2015 | Nitz ...................... A47B 21/06 320/103 |
| 2016/0050375 A1 | 2/2016 | Softer |
| 2016/0197504 A1* | 7/2016 | Hsia ...................... H02J 7/0045 307/23 |
| 2017/0264120 A1* | 9/2017 | Byrne ................... H01R 13/73 |

FOREIGN PATENT DOCUMENTS

| | | | |
|---|---|---|---|
| GB | 2531313 A * | 4/2016 | ............ H02J 7/0054 |
| JP | 2013258886 | 12/2013 | |
| WO | 2013112185 | 8/2013 | |

* cited by examiner

FURNITURE-MOUNTED ELECTRICAL
CHARGING STATION

The present application claims the filing benefits of U.S. provisional application Ser. No. 62/536,433, filed Jul. 24, 2017, which is hereby incorporated by reference herein in its entirety.

FIELD OF THE INVENTION

Field of the Invention

The present invention relates to electrical power supplies and, more particularly, to electrical power supplies having rechargeable batteries or the like.

Background of the Invention

Rechargeable electrical supplies are used to provide a convenient but limited supply of electrical power at various locations that may be separated from, or that may not have convenient access to, traditional wired power supplies.

SUMMARY OF THE INVENTION

The present invention provides an independently-powered or self-powered electrical charging station that can be unobtrusively mounted to furniture articles including shelves, work surfaces, tables, desks, and the like, and which is supplied with electrical energy from a rechargeable battery or other independent and replaceable power source (e.g., a capacitor or fuel cell), to provide at least a limited amount of electrical energy for charging portable phones, handheld computers and media players, and other electrical or electronic devices, especially portable electrical or electronic devices. The charging station may include several electrical connectors or receptacles or ports that allow multiple devices to be charged or supplied with power simultaneously. The battery or other self-contained power source associated with the charging station may be contained within a main housing, and may be rechargeable while positioned in the main housing. A separate outlet receptacle housing may be spaced from the main housing or mounted to and extending outwardly from the main housing, and positioned in a convenient user-accessible location along a furniture article.

According to one form of the present invention, a furniture-mountable electrical charging station includes a main housing configured for coupling to a furniture article, a self-contained electrical power source, a receptacle housing spaced apart from the main housing and also configured for coupling to the furniture article, an electrical output connector positioned in the receptacle housing, and an electrical wiring harness in electrical communication with the electrical output connector and the self-contained electrical power source. The main housing defines an interior region for mounting the self-contained electrical power source, and the electrical wiring harness extends between the main housing and the receptacle housing, and enables the self-contained electrical power source to supply DC electrical power to the electrical output connector.

According to another form of the present invention, a furniture-mountable electrical charging station includes a main housing defining an interior region, a self-contained electrical power source mounted in the interior region, a receptacle housing, and an electrical output connector. The receptacle housing has a lower region that is at least partially insertable into the interior region of the main housing, and an upper region that is at least partially insertable into an opening formed in the furniture article. The electrical output connector is mounted in the receptacle housing, and is in electrical communication with the self-contained electrical power source so that the self-contained electrical power source can supply DC electrical power to the electrical output connector.

Thus, the furniture-mountable electrical charging station of the present invention provides a source of electrical energy at portable furniture articles, which is capable of charging or energizing small electrical or electronic devices, and which permits the associated furniture articles to be moved to substantially any desired location without regard for the location of traditional wall outlets, floor outlets, or other wired power sources. The charging station is energized for at least a limited time by a self-contained electrical power source, such as a rechargeable battery, until its battery is depleted and will need to be recharged or exchanged for a charged battery.

These and other objects, advantages, purposes and features of the present invention will become apparent upon review of the following specification in conjunction with the drawings.

DESCRIPTION OF THE PREFERRED EMBODIMENTS

Figure 1:
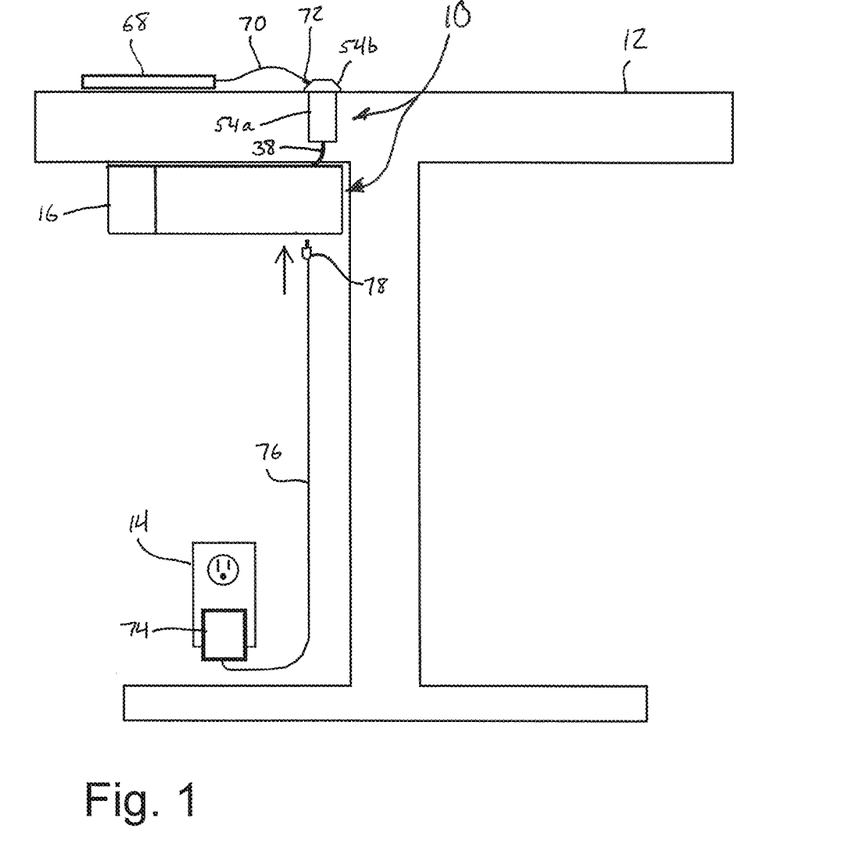
FIG. 1 is a diagrammatic end elevation of a furniture-mounted electrical charging station in accordance with the present invention, shown supported at a table.

Referring now to the drawings and the illustrative embodiments depicted therein, a furniture-mountable electrical charging station 10 is configured for mounting to a table 12, or to a desk, work surface, room divider, or substantially any furniture article where a self-contained power source may be desired, such as shown in FIG. 1. Charging station 10 is particularly well-suited for use with portable furniture articles such as chairs, tables, and desks in reconfigurable spaces such as cafes, restaurants, bars, banquet halls, airports and other public transit spaces, and in office or work areas. For example, patrons of bars and cafes, and users of reconfigurable work areas, often desire to move tables together or apart in order to accommodate different groups or to achieve a desired level of privacy, and also have a need to recharge small electronic devices such as mobile phones, media players, handheld computers, and tablet computers, all of which are commonly charged via low voltage DC connectors and cords. By mounting a self-contained charging station 10 at a movable table 12 or the like, patrons and/or staff are free to move the table or other furniture article to any desired location, while still having access to at least low voltage DC power for recharging purposes, without requiring a continuous electrical connection from an AC electrical wall outlet 14 (FIG. 1) or other separate electrical power source to the charging station 10.

Figure 2:
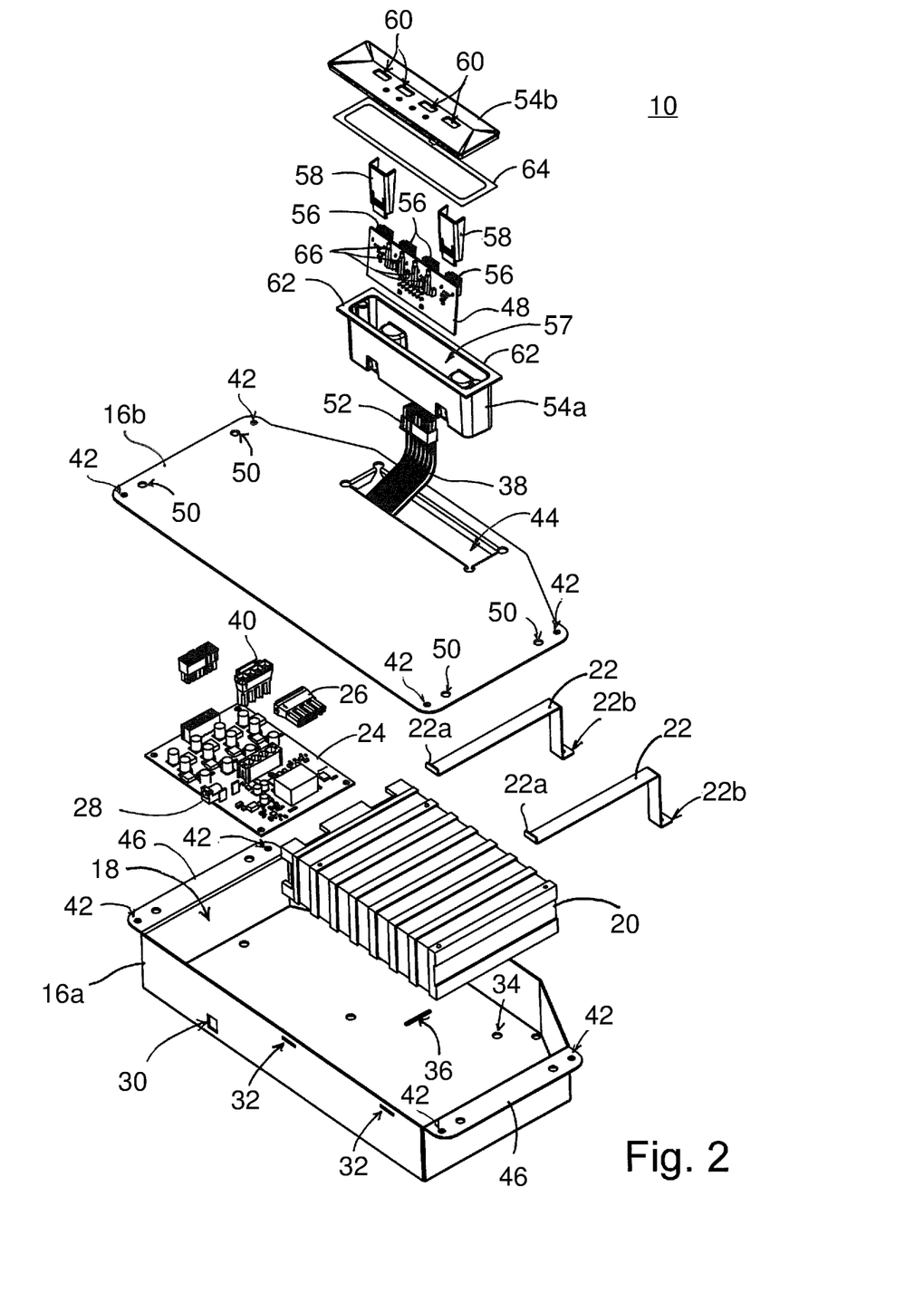
FIG. 2 is an exploded perspective view of the furniture-mounted electrical charging station of FIG. 1.
Figure 3:
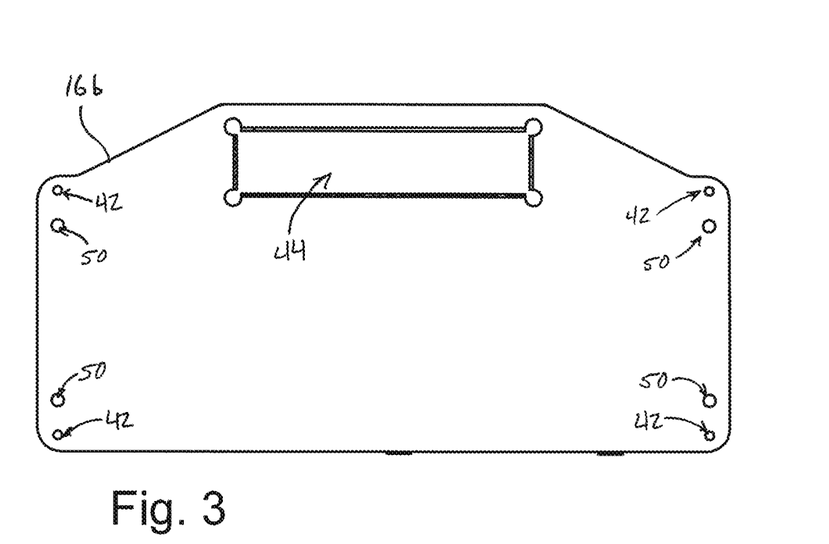
FIG. 3 is a top plan view of a main housing cover of the furniture-mounted electrical charging station.

Furniture-mounted electrical charging station 10 includes a main housing 16 including a base or tub portion 16a and a top or cover portion 16b, which cooperate to defines an interior region 18, such as shown in FIG. 2. A self-contained electrical power source such as a rechargeable battery 20 is mounted inside the main housing's interior region 18 using a pair of mounting straps 22, and an electronic circuit board 24 is also mounted inside interior region 18 and is in electrical communication with battery 20 via a battery connector 26. A recharging connector 28 is provided at a rear of circuit board 24 and is accessible from outside main housing 16 via an opening 30 formed in a rear wall of the housing's tub portion 16a.

Mounting straps 22 may be generally L-shaped as shown in FIG. 2, and may be rigid or semi-rigid (e.g., of sheet metal) with distal upwardly-bent tips 22a that are received in respective slots 32 formed in the tub portion 16a of main housing 16 (FIG. 10), and with proximal forwardly-bent tips 22b with respective bores for receiving threaded fasteners that also extend downwardly into respective mounting holes 34 formed in a bottom panel of tub portion 16a (only one mounting hole 34 is shown in FIG. 2). Optionally, a slot 36 formed in the bottom panel of tub portion 16a receives a downwardly-extending wall or other projection (not shown) of battery 20, which aids in properly positioning battery 20 in tub portion 16a during assembly. Optionally, main housing 16 can be made more aesthetically pleasing by applying a decorative cover or coating to the exposed outer surfaces thereof. For example, a woven layer of polyethylene terephthalate (PET) may be thermoformed and adhered to the main housing 16, which may be made from formed sheet metal.

Figure 4:
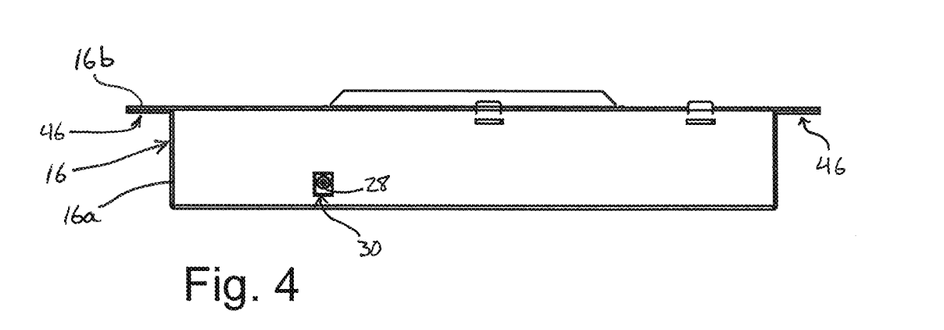
FIG. 4 is a rear elevation of the furniture-mounted electrical charging station.
Figure 5:
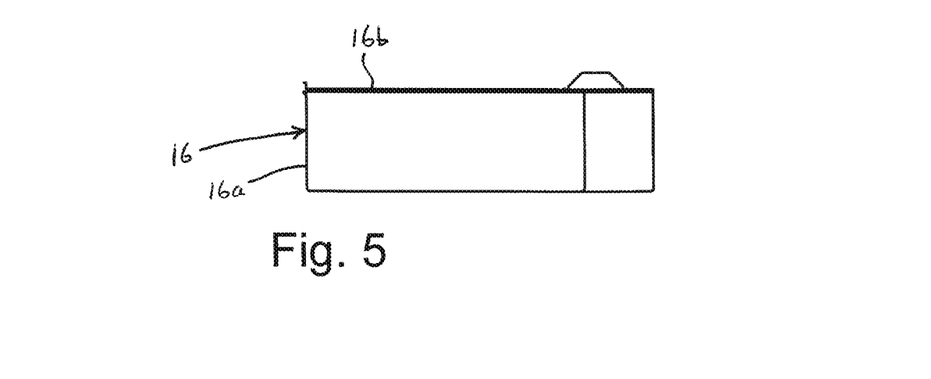
FIG. 5 is a left side elevation of furniture-mounted electrical charging station.
Figures 6, 7:
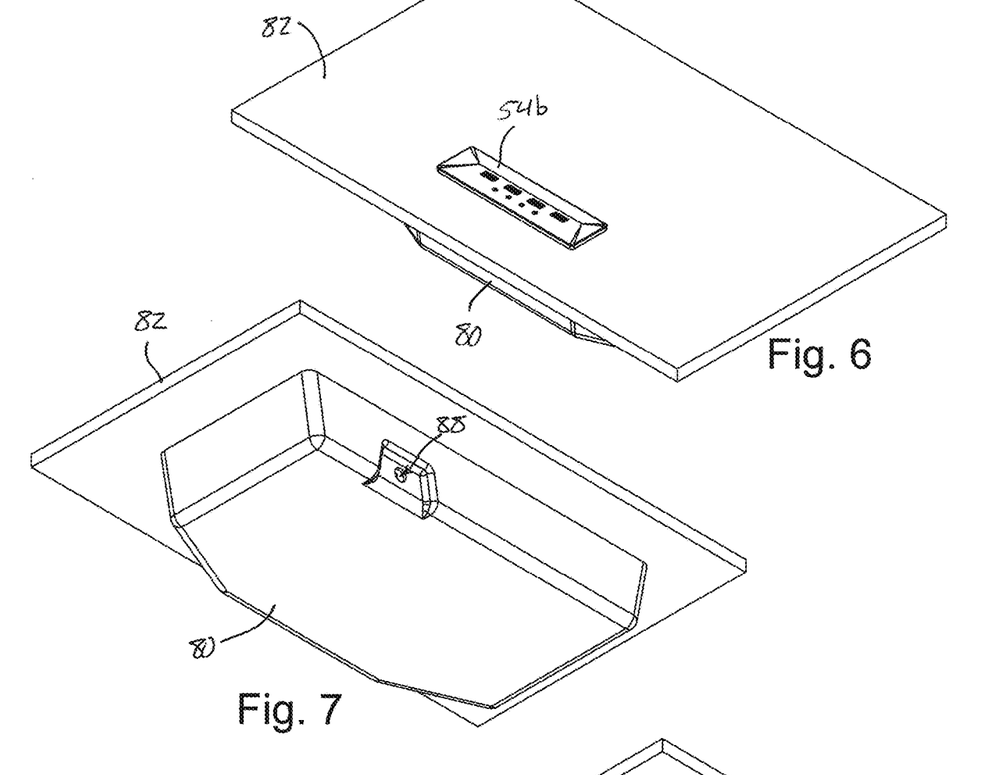
FIG. 6 is a top-front perspective view of another furniture-mounted electrical charging station in accordance with the present invention, shown supported at a section of a work surface.
FIG. 7 is a bottom-rear perspective view of the furniture-mounted electrical charging station of FIG. 6.
Figure 8:
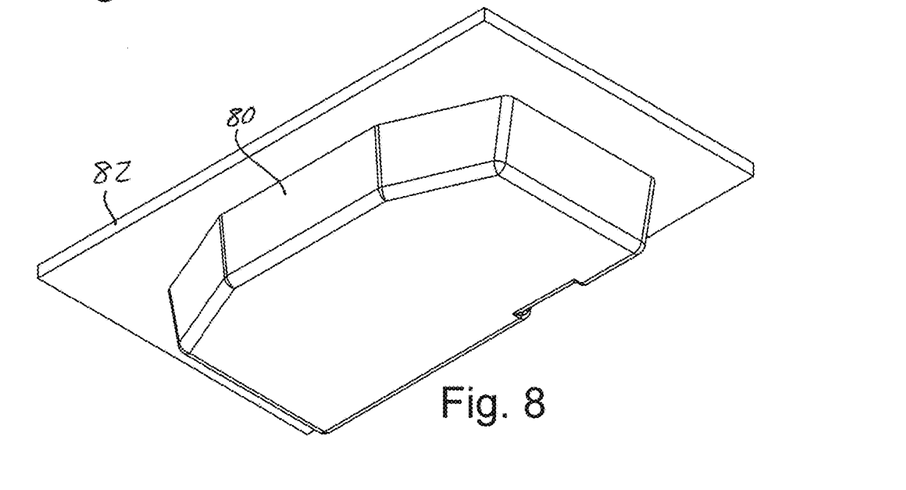
FIG. 8 is a bottom-front perspective view of the furniture-mounted electrical charging station of FIG. 6.

Once battery 20 and circuit board 24 are properly mounted in tub portion 16a, and an electrical wiring harness 38 is connected to circuit board 24 via a first harness connector 40, interior region 18 is enclosed by the housing cover portion 16b using suitable fasteners, such as self-tapping threaded screws, rivets, or threaded nuts and corresponding bolts that pass through respective fastener openings 42 formed in laterally outwardly-extending flanges 46 at each corner of main housing 16. Wiring harness 38 extends up and out through an opening 44 formed in housing cover portion 16b for connection to a low voltage DC receptacle board 48, as will be described below. Once main housing 16 has been assembled (FIGS. 1, 4 and 5), it is ready for attachment to the table 12 or other furniture article, such as using threaded fasteners that extend upwardly through respective fastener openings 50 formed at each corner of main housing 16, at each flange 46, to threadedly engage a portion of the table 12, such as the table underside as shown in FIG. 2.

Figure 9:
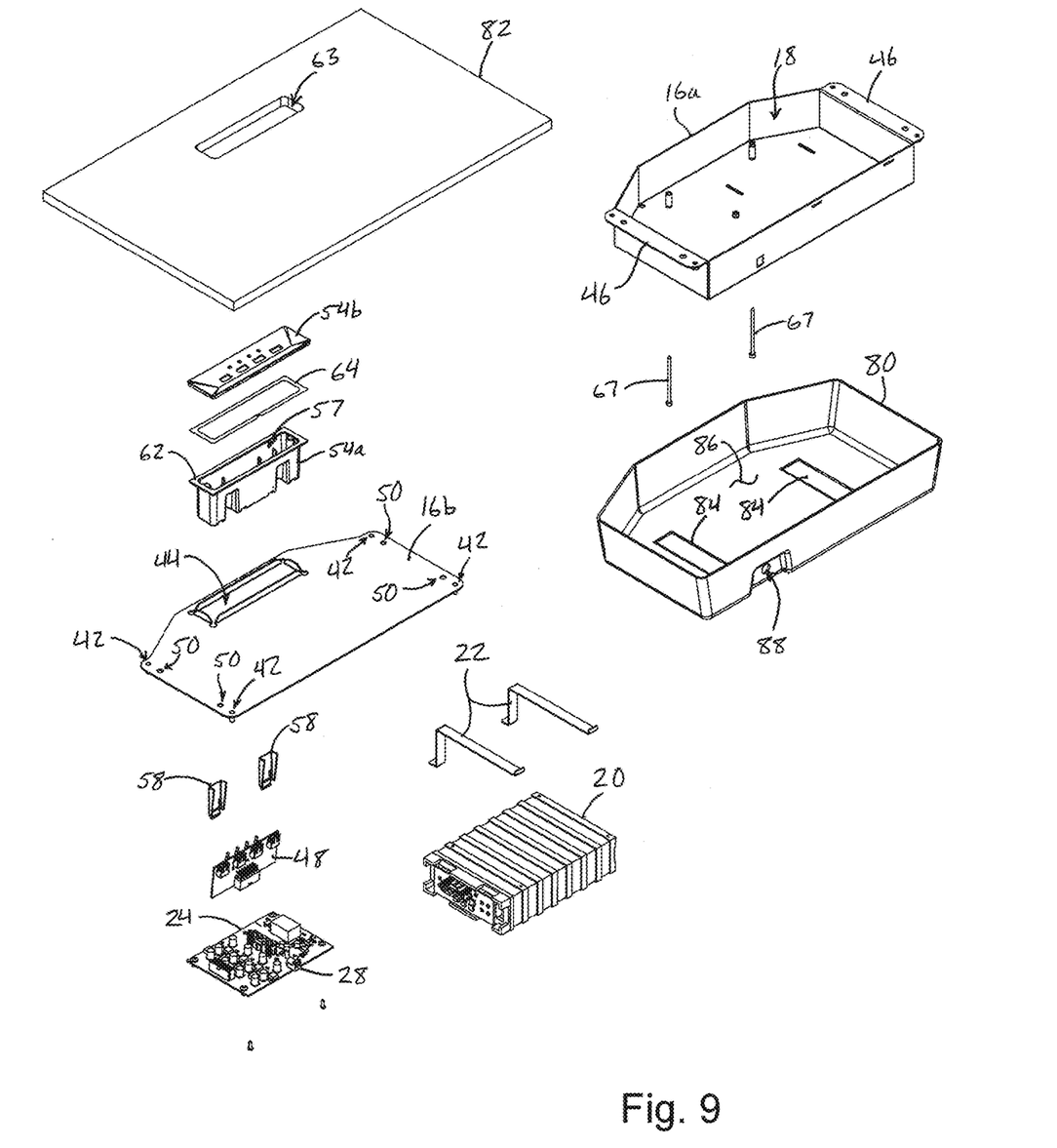
FIG. 9 is an exploded perspective view of the furniture-mounted electrical charging station of FIG. 6.
Figure 10:
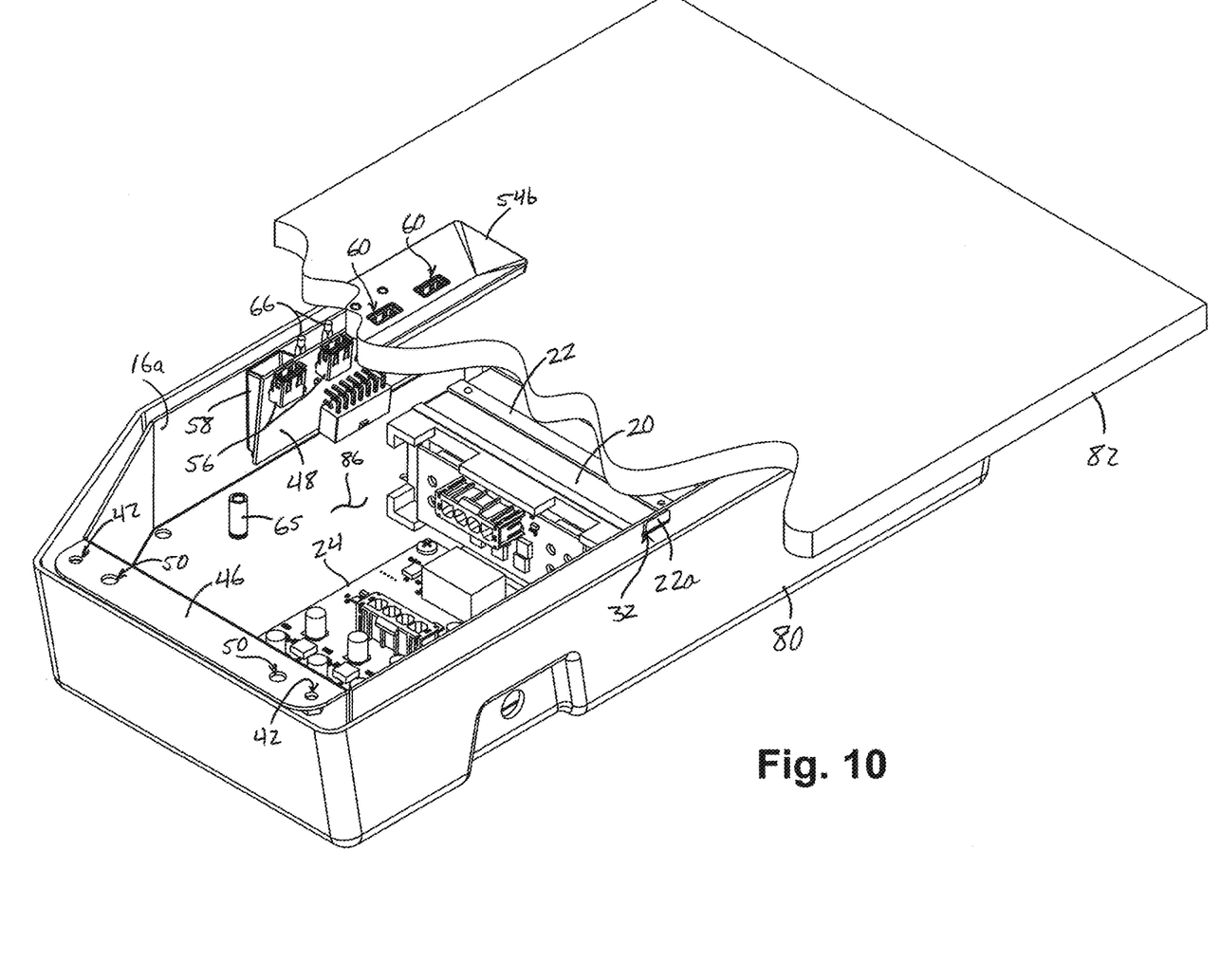
FIG. 10 is a top-rear perspective view of the furniture-mounted electrical charging station of FIG. 6, with portions of the work surface and charging station cut away to show interior detail.
Figure 11:
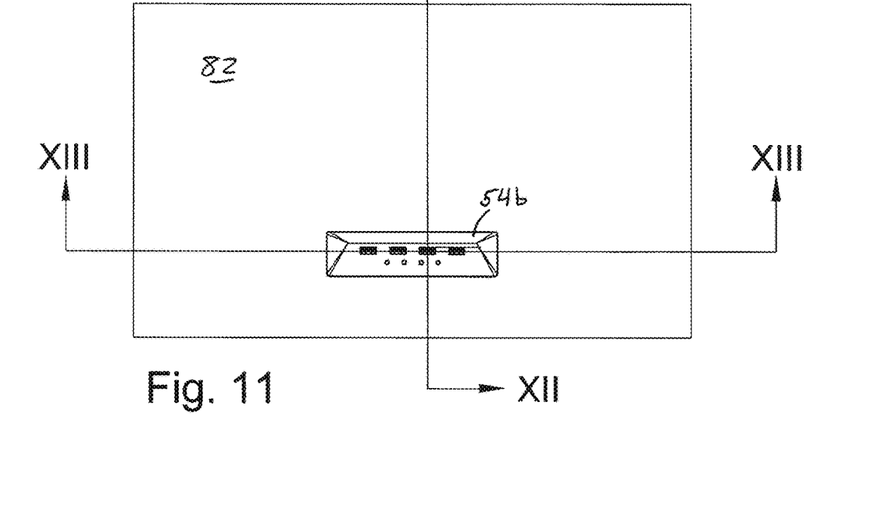
FIG. 11 is a top plan view of the furniture-mounted electrical charging station of FIG. 6.
Figure 12:
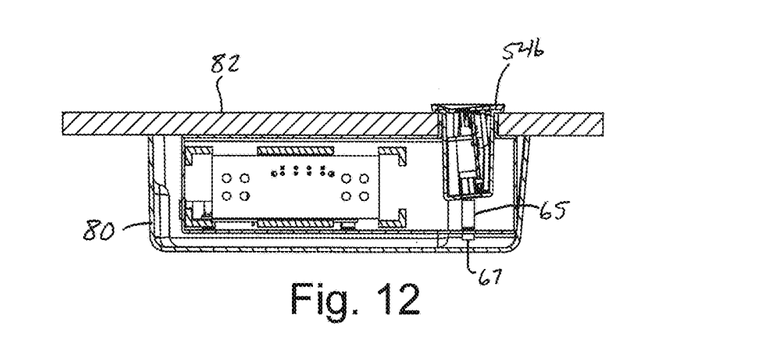
FIG. 12 is a side sectional elevation taken along line XII-XII of FIG. 11.
Figure 13:
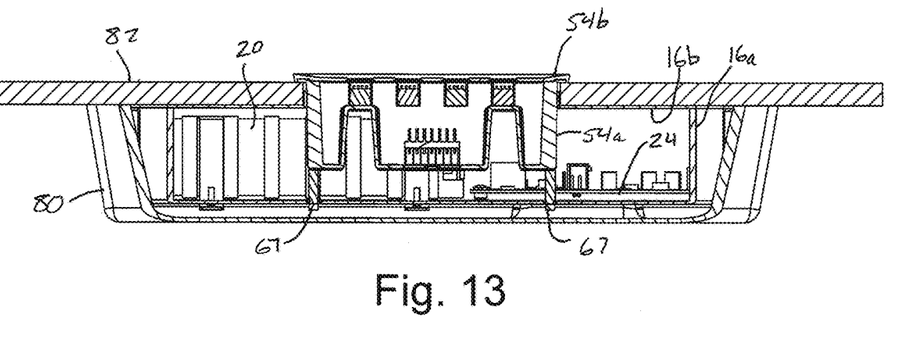
FIG. 13 is a front sectional elevation taken along line XIII-XIII of FIG. 11.

Low voltage DC receptacle board 48 is electrically coupled to electrical wiring harness 38 via a second harness connector 52 and is supported inside a DC receptacle housing formed by a base or tub portion 54a and a top or cover portion 54b, such as shown in FIG. 2. As best shown in FIG. 10, a pair of locating inserts 58 support receptacle board 48 in a fixed location inside a cavity 57 defined by tub portion 54a and cover portion 54b, so that individual DC receptacles 56 are properly aligned with respective receptacle openings 60 formed in cover portion 54b upon assembly. Tub portion 54a includes an upper flange 62 that permits the DC receptacle housing to rest in an opening 63 formed in a tabletop or other surface, such as shown in FIGS. 1, 6, 9 and 10. A gasket 64 (FIGS. 2 and 9) may be provided between flange 62 and cover portion 54b to resist intrusion of liquids and other contaminants into cavity 57. Although it is envisioned that the DC receptacle housing would typically be spaced apart from the main housing 16, it is envisioned that for applications where compactness is desired, at least the base or tub portion 54a may be inserted at least partially into the opening 44 formed in the cover portion 16b of main housing 16, such as shown in FIGS. 12 and 13. In this arrangement, the tub portion 54a may rest atop a pair of spacers in the form of tubular bosses 65 that extend upwardly from a bottom surface of the main housing 16a (FIGS. 9, 10, 12 and 13), and may be secured at the tubular bosses 65 by a pair of mechanical fasteners 67 (FIGS. 9, 12 and 13). The lengths of the tubular bosses 65 may be selected according to the thickness of the table top or work surface 82 to which the charging station 10 is attached, with taller bosses 65 used for thicker work surfaces 82. In this manner, the height to which the DC receptacle housing's cover portion 54b extends above the housing cover portion 16b can be adjusted for a particular application.

In the illustrated embodiment, DC receptacle board 48 includes four status indicator lamps 66 that can provide general information to a user, such as the state of charge of battery 20 (e.g., one illuminated lamp 66 indicating about 0%-25% charge remaining, two illuminated lamps 66 indicating about 26%-50% charge remaining, three illuminated lamps 66 indicating about 51%-75% charge remaining, and four illuminated lamps 66 indicating about 76%-100% charge remaining). Other information that can be provided by indicator lamps 66 includes whether a corresponding DC receptacle 56 is electrically energized and/or currently providing electrical power to an electrical connected device, such as a portable phone or computer 68 that is connected to one of the DC receptacles 56 via a charging cord 70 and plug 72, such as shown in FIG. 1, and whether battery 20 is being charged by an electrical power source, such as a DC power converter 74 plugged into AC wall outlet 14 and having an associated DC charging cord 76 with connector 78 adapted to engage the recharging connector 28 that is accessible at the back of main housing 16a.

In addition to sending power to DC receptacle board 48, electronic circuit board 24 may control the charging of battery 20 when connected to a suitable energized power source such as wall outlet 14, and also the illumination of status indicator lamps 66, which may provide different colors and/or flashing patterns to provide information as desired. It will further be appreciated that rechargeable battery 20 is representative of substantially any rechargeable or renewable electrical storage device, including a rechargeable chemical pile battery or a capacitor, a fuel cell, or the like.

It is envisioned that, in most applications, the furniture-mounted electrical charging station 10 would primarily be used to supply small or portable electronic devices, including mobile phones, electronic media players, hand-held or tablet computers, and the like, with low voltage DC power for recharging purposes. Therefore, electrical output connectors 16 may be low voltage DC connectors or receptacles of substantially any type, including USB connectors, mini-USB connectors, micro-USB connectors, USB-C connectors, USB-A connectors (shown), round and/or co-axial receptacles or ports, and the like, and may include two or more electrical connectors of the same or different configurations to provide access to electrical power for common types of devices. In the illustrated embodiment, the DC receptacle housing is readily fitted and re-fitted with different receptacle boards having substantially any desired selection and number of connectors, based on the needs of a particular application.

Although the furniture charging station described herein is primarily intended to provide users with access to low voltage DC power, it will be appreciated that high voltage AC power may optionally be provided at AC power outlets, such as in a modified receptacle housing similar to DC receptacle housing 54. Such AC power outlets may be energized when the charging station 10 is equipped with a rechargeable battery having sufficient capacity, and a DC-to-AC converter contained inside the interior of main housing 16. It is also envisioned that AC outlets may be energized only when a separate or optional power cord is connected to an energized wall outlet 14 or other power source to supply high voltage AC power directly to charging station 10. Optionally, wireless power transmission technologies such as a support pad with conductive surfaces in an alternating-polarity arrangement, or with magnetic field inductive resonance or electric field resonant capacitive coupling technologies, may be provided at DC receptacle housing 54.

It is further envisioned that charging station 10 may be equipped with a power switch that selectively energizes and de-energizes the DC receptacles 56. Optionally, charging station 10 may include circuitry enabling it to send a wireless signal to a monitoring station, the wireless signal including information such as energy level of the battery 20 or other onboard power source, current and historical rates of energy consumption, and approximate time remaining before battery 20 will need to be recharged. Moreover, it will be appreciated that although the charging station 10 is described and illustrated herein as being configured for under-mount applications, such as being attached to the bottom surface of table 12, charging stations may be adapted for attachment to various other types of furniture articles and in other locations, such as mounted in an opening formed in a table or desk surface, along a wall or room divider, or under the seat portion of a chair, without departing from the spirit and scope of the present invention.

Referring now to FIGS. 6-13, the charging station 10 is provided with a contoured cover 80 made from molded resinous plastic, which surrounds and cooperates with a portion of a work surface 82 (such as a tabletop or desktop or shelf) to enclose the main housing 16a. Cover 80 provides a more aesthetically pleasing appearance, to the extent that it may be visible beneath the work surface 82, and provides smoother and more rounded outer surfaces that are less likely to cause discomfort if contacted by a user's hands or legs while the user is at the work surface 82. Cover 80 is attached to the main housing 16a after the main housing is secured to the underside of the table 12 or work surface 82 as described above, using mechanical fasteners or adhesive strips positioned in surface recesses 84 along an upwardly-facing bottom surface 86 of the cover 80, such as shown in FIG. 9. A charging connector opening 88 is formed in a rear wall of the cover and is aligned with the recharging connector 28 and the opening 30 formed in the main housing's tub portion 16a.

Accordingly, the furniture-mounted electrical charging station of the present invention provides a self-contained power supply that is capable of charging mobile phones and other small or portable electronic or electrical devices, and which may be particularly well suited for use by patrons or customers of commercial establishments or work areas in which a temporary low voltage power supply is occasionally needed or desired. The operators or administrators of many such establishments and work areas often permit or encourage patrons or users to move furniture as desired, so that the use of self-contained furniture-mounted electrical charging stations facilitates moving furniture and/or reconfiguring work or gathering areas without concern for maintaining continuous electrical connections for power cords or disabling electrical power if the furniture is moved away from traditional wall outlets.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A furniture-mountable electrical charging station comprising:
    a main housing defining an interior region and having a housing surface defining an opening, wherein said housing is configured for coupling to a furniture article and oriented with said housing surface positioned along and facing a first surface of the furniture article;
    a self-contained electrical power source disposed in said interior region;
    a receptacle housing having a proximal portion sized and shaped to extend through said opening in said housing surface and into said interior region, said receptacle housing having a distal portion spaced outside of said interior region and a flange of said distal portion configured for mounting along a second surface of the furniture article opposite the first surface at an opening formed in the furniture article;
    an electrical output connector mounted in said receptacle housing; and
    a plurality of electrical conductors establishing electrical communication from said self-contained power source to said electrical output connector;
    wherein said self-contained electrical power source is operable to supply DC electrical power to said electrical output connector; and
    wherein said proximal portion of said receptacle housing is insertable to different depths into said interior region of said main housing according to a distance between the first and second surfaces of the furniture article.

2. The furniture-mountable electrical charging station of claim 1, wherein said plurality of electrical conductors form an electrical wiring harness extending from said interior region of said main housing to said receptacle housing.

3. The furniture-mountable electrical charging station of claim 2, further comprising an electronic circuit board disposed in said interior region and in electrical communication with said electrical wiring harness and said self-contained electrical power source, wherein said electronic circuit board is operable to control recharging of said self-contained electrical power source.

4. The furniture-mountable electrical charging station of claim 3, further comprising a recharging connector at said electronic circuit board and accessible through an opening formed in said main housing, wherein said recharging connector is configured to selectively receive a detachable charging plug associated with an external power source.

5. The furniture-mountable electrical charging station of claim 4, further comprising a cover configured to cooperate with the first surface of the furniture article to fully enclose said main housing, wherein said cover defines a charging plug opening that is aligned with said opening formed in said main housing.

6. The furniture-mountable electrical charging station of claim 1, wherein said receptacle housing is configured to be spaced apart from said main housing and mounted remotely from said main housing along the furniture article with said plurality of electrical conductors extending outwardly through said opening formed in said main housing.

7. The furniture-mountable electrical charging station of claim 1, further comprising:
 a recharging connector in electrical communication with said self-contained electrical power source, wherein said recharging connector is accessible from an exterior of said main housing; and
 a detachable charging cord configured to be selectively coupled to said recharging connector and configured to recharge said self-contained electrical power source.

8. The furniture-mountable electrical charging station of claim 1, wherein said receptacle housing comprises a cover portion configured to be positioned at the opening formed in the furniture article, and said charging station further comprises a spacer positioned in said interior region between a surface of said main housing and said proximal portion of said receptacle housing, wherein said spacer is configured to set a minimum distance between said cover portion and said main housing.

9. The furniture-mountable electrical charging station of claim 1, further comprising a status indicator lamp at said receptacle housing, wherein said status indicator lamp is operable to provide at least one chosen from (i) a level-of-charge indicator for said self-contained electrical power source, (ii) an indication of whether or not said electrical output connector is electrically energized, and (iii) an indication of whether or not said electrical output connector is supplying electrical power to a portable electronic device that is electrically coupled to said electrical output connector.

10. The furniture-mountable electrical charging station of claim 1, wherein said self-contained power source comprises one chosen from a rechargeable battery, a rechargeable capacitor, and a fuel cell.

11. The furniture-mountable electrical charging station of claim 1, wherein said electrical output connector comprises a low voltage DC receptacle.

12. The furniture-mountable electrical charging station of claim 11, wherein said low voltage DC receptacle comprises at least one chosen from a USB charging receptacle and a coaxial charging receptacle.

13. A furniture-mountable electrical charging station comprising:
 a main housing defining an interior region and comprising a planar upper surface defining an opening, said main housing configured for mounting at a lower surface of a furniture article with said planar upper surface facing the lower surface in a parallel arrangement;
 a self-contained electrical power source mounted in said interior region;
 a receptacle housing comprising a lower region that is insertable by a variable distance into said interior region of said main housing at said opening in said planar upper surface, and an upper region that is simultaneously at least partially insertable into an opening formed in the furniture article, said upper region comprising a flange configured to rest along an upper surface of the furniture article; and
 an electrical output connector mounted in said receptacle housing and in at least selective electrical communication with said self-contained electrical power source;
 wherein said self-contained electrical power source is operable to supply DC electrical power to said electrical output connector.

14. The furniture-mountable electrical charging station of claim 13, wherein said receptacle housing is repositionable relative to said main housing according to a thickness of the furniture article.

15. The furniture-mountable electrical charging station of claim 14, further comprising a spacer positioned in said interior region of said main housing, between an interior surface of said main housing and said lower region of said receptacle housing, wherein said spacer is configured to set a distance between said upper region of said receptacle housing and said planar upper surface of said main housing.

16. The furniture-mountable electrical charging station of claim 15, wherein said planar upper surface comprises a removable cover, wherein said opening defined in said planar upper surface is configured to be aligned with the opening formed in the furniture article.

17. The furniture-mountable electrical charging station of claim 13, wherein said receptacle housing is configured to be spaced apart from said main housing and mounted remotely from said main housing along the furniture article.

18. The furniture-mountable electrical charging station of claim 17, comprising an electrical wiring harness extending from said interior region of said main housing to said receptacle housing, for directing electrical power from said self-contained electrical power source to said electrical output connector.

19. The furniture-mountable electrical charging station of claim 18, further comprising an electronic circuit board disposed in said interior region of said main housing, wherein said electronic circuit board is in electrical communication with said electrical wiring harness and said self-contained electrical power source, and wherein said electronic circuit board is operable to control recharging of said self-contained electrical power source.

20. The furniture-mountable electrical charging station of claim 19, further comprising a cover configured to cooperate with the lower surface of the furniture article to enclose said main housing, wherein said cover defines a charging plug opening providing access to a recharging connector at said electronic circuit board.

* * * * *